United States Patent [19]

Dechene et al.

[11] Patent Number: 4,774,453

[45] Date of Patent: Sep. 27, 1988

[54] MEASURING FLOW OF INSULATING FLUIDS

[75] Inventors: Ronald L. Dechene, Boxford, Mass.; Thomas B. Smith, Atkinson, N.H.; Gary H. Tougas, Ipswich, Mass.

[73] Assignee: Auburn International, Inc., Danvers, Mass.

[21] Appl. No.: 658,584

[22] Filed: Oct. 9, 1984

[51] Int. Cl.[4] .................................... G01N 27/60
[52] U.S. Cl. ................................ 324/453; 324/454
[58] Field of Search ................ 324/452, 453, 454; 73/861.08

[56] References Cited

FOREIGN PATENT DOCUMENTS 2100748 7/1971 Fed. Rep. of Germany ...... 324/453
655989 4/1979 U.S.S.R. ............................ 324/454
1341841 12/1973 United Kingdom ............... 324/454

OTHER PUBLICATIONS

Carruthers et al, "Charge Relaxation in Hydrocarbon Liquids Flowing Through Conducting and Non-Conducting Pipes," Journal of The Institute of Petroleum, vol. 48, No. 462, Jun. 1962, pp. 169–179.

Beck, "Correlation in Instruments:Cross Correlation Flowmeters", Journal of Scientific Instruments, vol 14, 1984.

Primary Examiner—Stewart J. Levy
Assistant Examiner—Kevin D. O'Shea
Attorney, Agent, or Firm—Jerry Cohen

[57] ABSTRACT

Flow velocity measurement apparatus for cryogenic liquid flowing in a pipe (1) past spaced upstream (12) and downstream (14) electrodes with triboelectric, flow-generated determined signals at the electrodes directed to a cross-correlator (2) which shifts the time bases of the signals relative to each other and reiteratively multiplies the shifted signals until a maximum multiplication product is achieved, the time shift associated with such maximum being flow transit time between the electrodes.

2 Claims, 3 Drawing Sheets

MEASURING FLOW OF INSULATING FLUIDS

BACKGROUND OF THE INVENTION

The present invention relates to mass flow measurement of fluids and has particular advantage in connection with measurement of jet aircraft fuels, rocket fuels and oxidizers, cryogens generally. The invention incorporates our discovery that intrinsic charge generation transfer phenomena of such fluids and also of fluid borne solid particles media (where the particles are essentially non-conductive) can be used effectively as a means of measuring velocity of the fluid and our further invention and discovery of method steps and apparatus for making such effective utilization.

The triboelectric effect is the mechanism which generates static electric charge when two materials rub against each other. A stored charge can be generated in particles and fluids by flow alone in a flowing stream and the charged stream can provide a readable current or voltage signal downstream.

It is a principal object of the invention to provide means for measuring velocity and mass flow of fluids as described above.

Further objects of the invention comprise the realization of reliable, accurate and calibratable measurements of such fluids utilizing the triboelectric effect.

SUMMARY OF THE INVENTION

When a cryogenic liquid flows through a pipe, the fluid randomly picks up charges from the pipe walls through the triboelectric effect. These charges attach themselves to atoms or molecules in the fluid and move with it without relative motion for moderate periods of time. The fluid thus becomes a moving randomly charged dielectric medium which will produce a unique voltage-versus-time signal in sensors capable of measuring it.

Similar charge development effects apply to gas borne particle streams. A pair of sensor electrodes, located in the walls of the pipe, (one upstream of the other) measure the voltages induced as the charged sections of fluid move past them. Since the charges move with the fluid, the voltage waveform at the downstream sensor is mainly a time-delayed version of the same, random voltage waveform at the upstream sensor. This sameness is true only within a narrow range of distance whose length depends on several characteristics of the fluid and the charge applied thereto. In order to determine the time delay between the two signals, the voltages from the sensors are sampled by A/D converters and stored in microprocessor memory. The time delay between the two signals is then determined by performing a digital cross-correlation on the two sets of data in memory. Given the time delay, the velocity is easily computed, since the sensor spacing is known.

Cross-correlation is used to find the time delay between two signals which are time-displaced with respect to each other. The correlation calculation consists of taking samples of the two signals and processing them by shifting one relative to the other, multiplying them together, and taking the average of the result. If the input signal is random (i.e., not periodic), the value of the cross-correlation will remain small until the imposed correlation delay cancels the original time separation. When this occurs, the cross-correlation will reach a maximum since the two signals are then identical and the correlation process effectively multiplies the signal by itself, thus calculating the mean squared value of the original signal. This peak is the maximum possible result of a correlation and its location (on a scale of time shifts of the waveforms developed at the two sensors relative to each other) thus identifies the time delay (or flow movement from the upstream sensor to downstream sensor) for velocity calculation. The availability of inexpensive high speed digital multipliers and analog to digital converters make digital cross-correlation, per se, a simple and straightforward process.

Other objects, features and advantages will be apparent from the following detailed description of preferred embodiments thereof taken in connection with the accompanying drawings, in which:

DETAILED DESCRIPTION OF PREFERRED EMBODIMENTS

Figure 1:
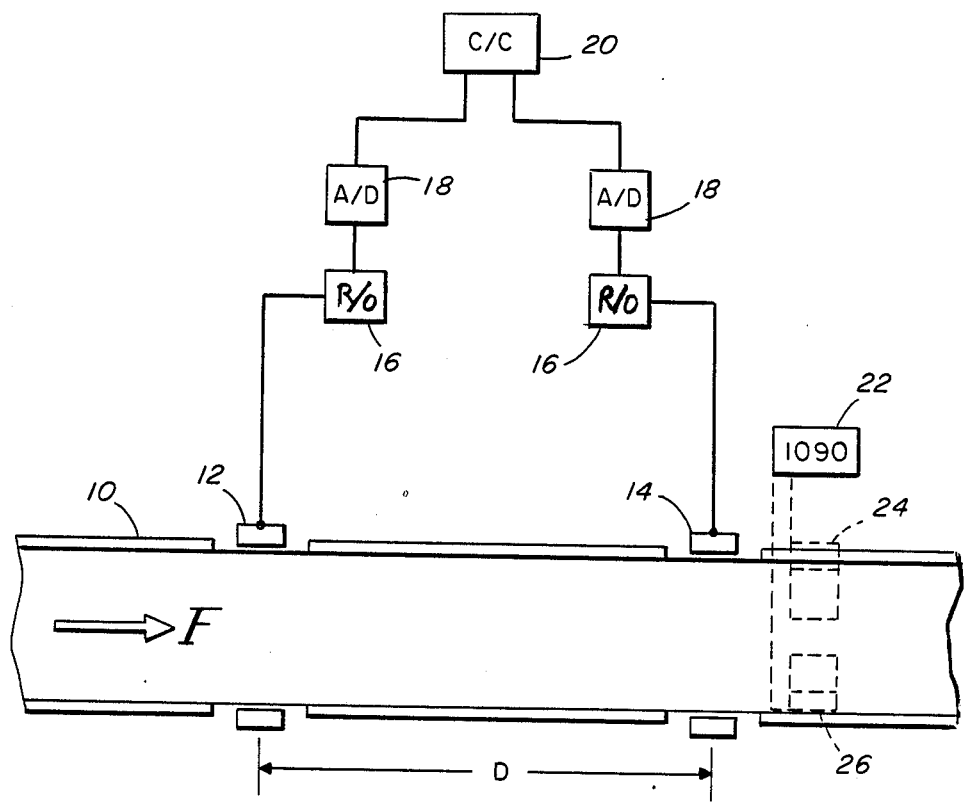
FIG. 1 is a block diagram representation of apparatus made in accordance with a preferred embodiment of the invention; showing two sensors in a pipe and related block diagram of controls.

Referring now to FIG. 1, there is shown a preferred embodiment of apparatus for practice of the invention comprising a pipe form of flow path 10 (for fluid flow F) with spaced electrodes 12 and 14 therein spaced by a distance D. Read-out circuitry 16 is provided for the electrodes. Each electrode is electrically isolated from surrounding structure of the pipe to form a control capacitor with the fluid comprising the dielectric.

The smoothed, analog signal obtainable through the circuitry 16 is fed to analog/digital converters 18 and to a central signal processing facility 20 etc. including digital multipliers, memory, high speed I/O and comparator segments.

Figure 3:
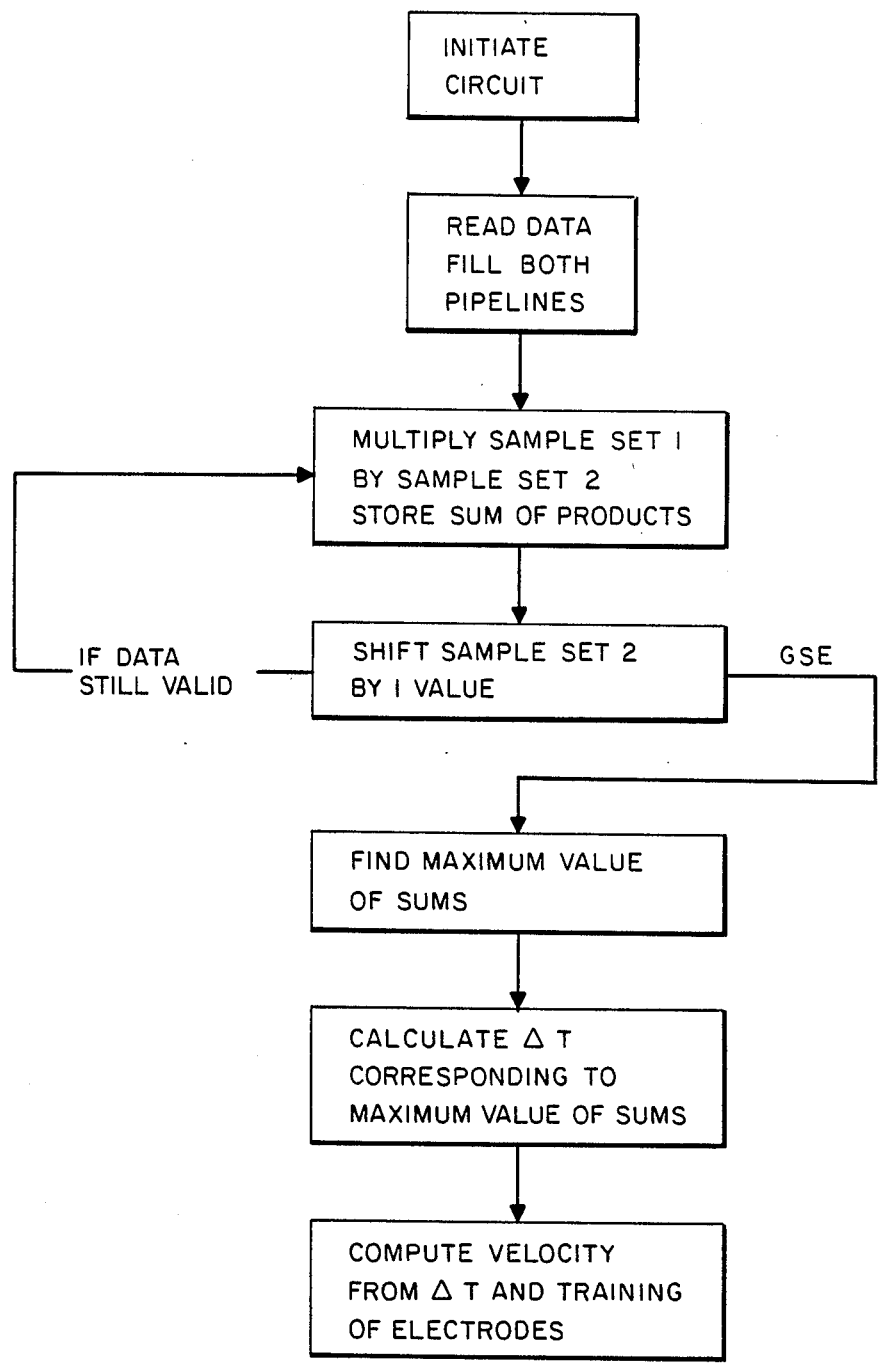
FIG. 3 is a flow chart of the time shifting of waveforms associated with the two sensors.

FIG. 3 is a flow chart of the cross-correlation processing method using voltage or current (via a load resistor) established in circuit "pipelines" of the FIG. 1 apparatus. The integrated amplitudes over a time range waveforms of the two electrodes are sampled and multiplied, then relatively shifted and multiplied in a process that is repeated iteratively until a preset number of shifts is made to cover all of a defined range of elapsed time. For instance a data value at the upstream electrode can be multiplied by data values at the second electrodes as taken 1, 2, 3, 4, 5, 6, 7, 8, 9, 10 milliseconds later and stored in memory. The memory product store will have a triangular form with a peak as determined by elapsed time.

The method utilizes the fact that maximum coincidence between waveforms produces maximum multiplication product.

Figure 2:
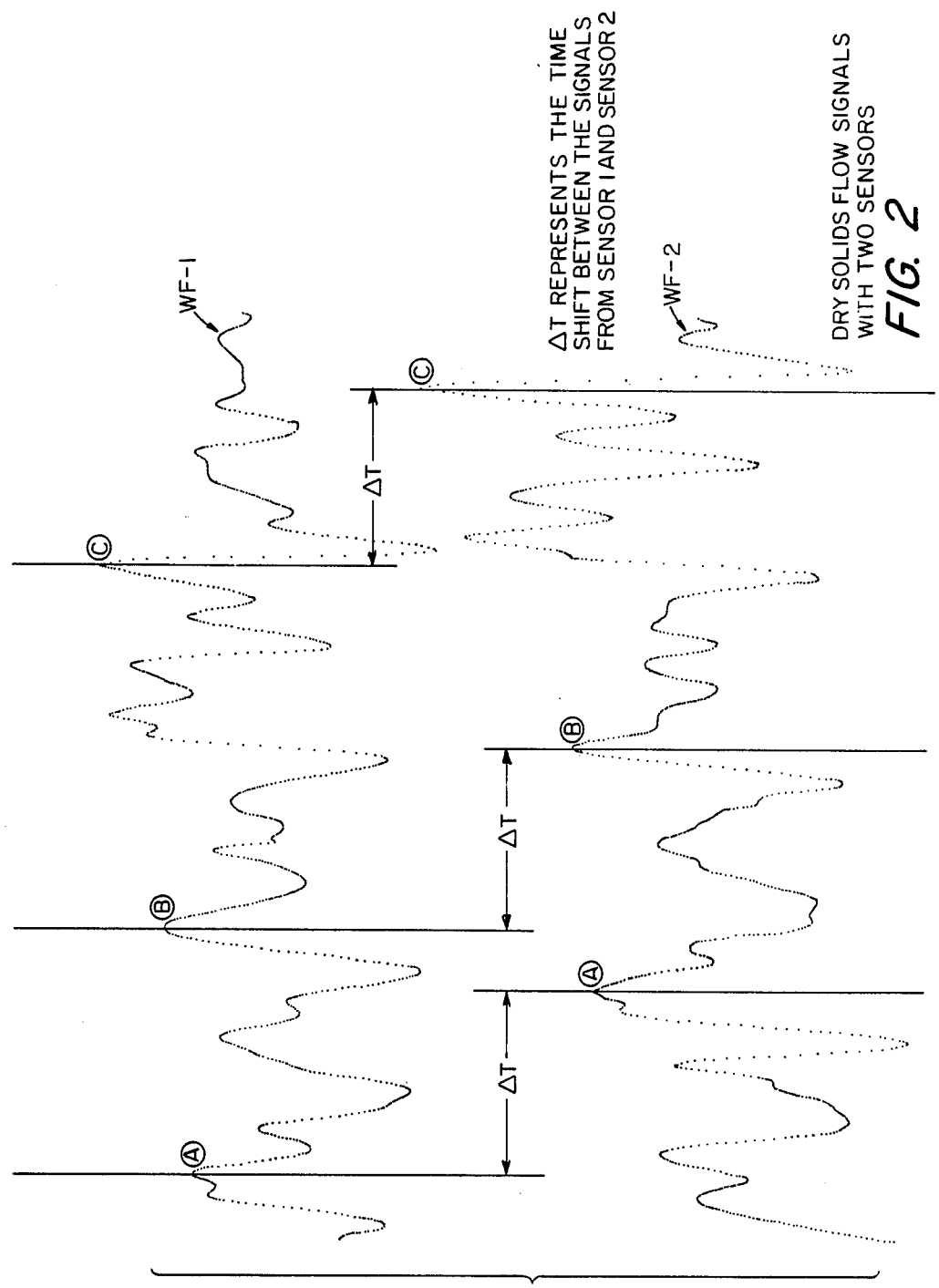
FIG. 2 is a current-time trace taken as to two spaced sensor elements of the FIG. 1 apparatus.

FIG. 2 shows waveforms of a first waveform WF-1 comprising an electrical read-out of voltage (or current via an appropriate load resistor) developed at the upstream electrode of the FIG. 1 apparatus versus time and WF-2 is a similar trace developed at the downstream electrode. Each such waveform has peaks (A), (B), (C) with strong correlation between the corresponding such peaks of the two waveforms, over a short period of elapsed time, a few milliseconds to a few seconds depending on the flow conditions involved.

Over such a short period velocity variation is negligible and a delta ($\Delta$) T between cross-correlated peaks (A), (B), (C) of the two waveforms will, therefore, appear as a virtual constant or a linearly (or nearly linearly) changing quantity which can be averaged, to afford a reliable readout using inexpensive electronic readout equipment, simple programming instructions and with modest data buffering and storage requirements.

(a) There are means defining a liquid flow path (10), a pair of upstream (12) and downstream (14) sensor electrodes.

(b) There are means for providing for each of the electrodes, as a set of digital data, samples representing a voltage-time trace (16, 18).

(c) There are means (20—c/c) for cross-correlating the two sets of data samples relative to each other including "multiplying them (the samples) together, and taking the average of the result".

(d) When such result is a maximum, that is an indicator that a correct time shift has been made putting the waveforms represented by the digital data sets into maximum coincidence. That time is the delay of flow between the upstream and downstream electrodes and is used to determine velocity, i.e. $v = d/t$ where d is the known spacing distance between the electrodes and t is the time determined by the cross-correlation. Thus, liquid flow velocity is determined.

British patent specification No. 1,341,841 (Beck) published Dec. 28, 1983, may be referred to for an example of a cross correlation algorithm equation utilizing time base shifting and re-iterative multiplication until a maximum of such multiplication product (cross correlator product) is achieved to indicate transit time of a flow stream past spaced electrodes. The same and alternate forms of cross-correlation (e.g., incidence of zero crossing events) are disclosed in Beck, "Correlation In Instruments: Cross-correlating Flowmeters," (Journal of Scientific Instruments, vol. 14, 1984). References cited in the latter show evolution of the technique of cross-correlationg in flow measurement generally, and in other fields.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. Flow velocity measuring apparatus for electrically non-conducting liquid comprising, in combination,
    (a) means defining a liquid flow pipe and a pair of sensor electrodes spaced along the flow path, one upstream of the other by a known distance,
    (b) means for providing for each of the upstream and downstream electrodes an electrical readout of triboelectric generated current at each electrode as a set of data samples defining a time variance waveform,
    (c) means for cross-correlating the two data sets of the upstream and downstream electrodes by time-displacement shifting one set of data samples relative to the other in successive iterations,
    (d) determining the nearest coincidence of relatively shifted wareforms and utilizing the time shift which produced such coincidence as a denomenator of a fraction, the numerator of which is said known distance, to express the velocity of the fluid.

2. Apparatus in accordance with claim 1 wherein the cross-correlator comprises means for time shifting voltage-time traces relative to each other, reiteratively multiplying the aligned traces as established by each such shift comparing the multiplication products of a consecutive series of such multiplications in a given time span and determining the maximum such product, correlated with a given time shift, whereby such shift is reliably established as the time interval flow from the upstream sensor to the downstream sensor at the then prevailing flow velocity.

* * * * *